3,121,362
TRIMMING MACHINE
Max A. Shepherd and Hans H. Zurmuhlen, Dallas, Tex., assignors to Taylor Publishing Company, Dallas, Tex., a corporation of Texas
Filed Aug. 6, 1962, Ser. No. 215,098
10 Claims. (Cl. 83—404)

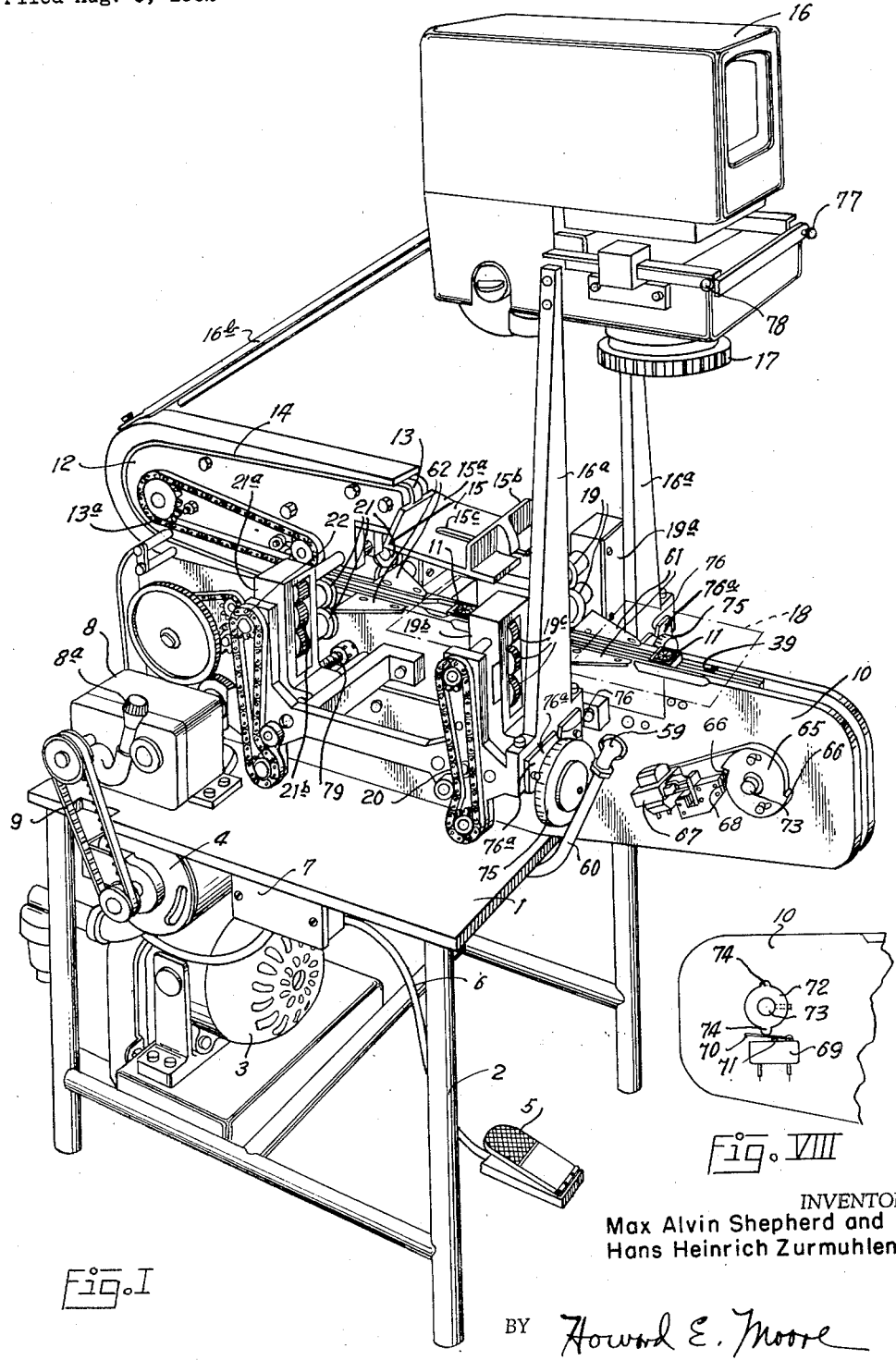

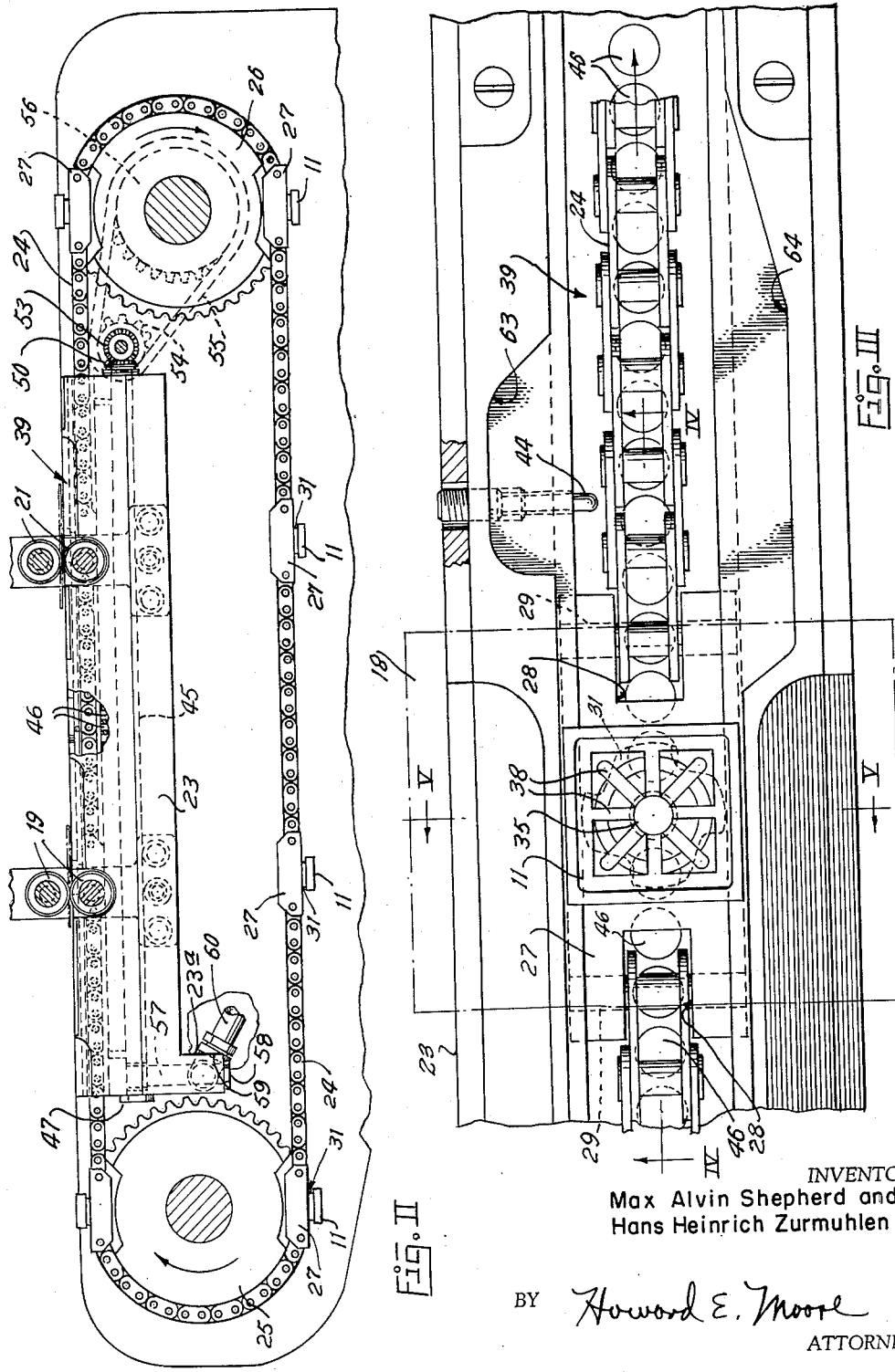

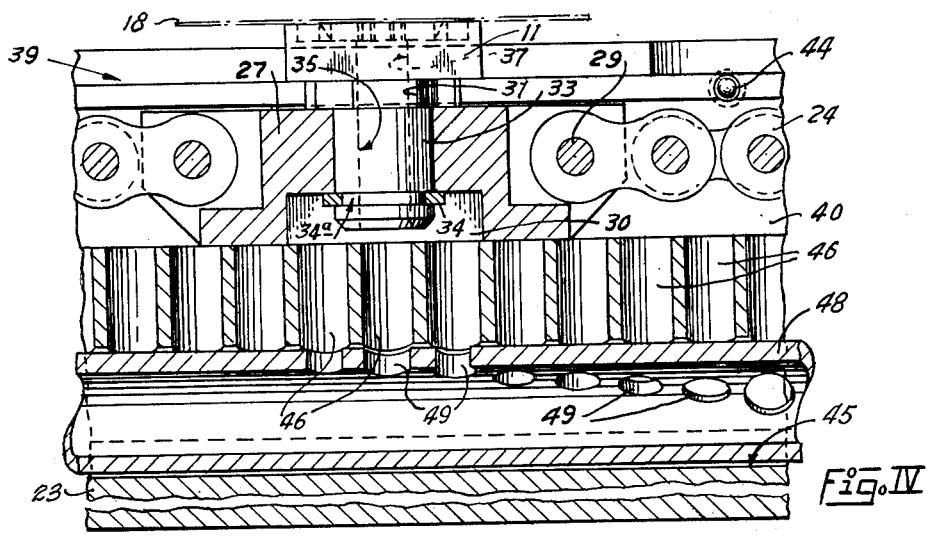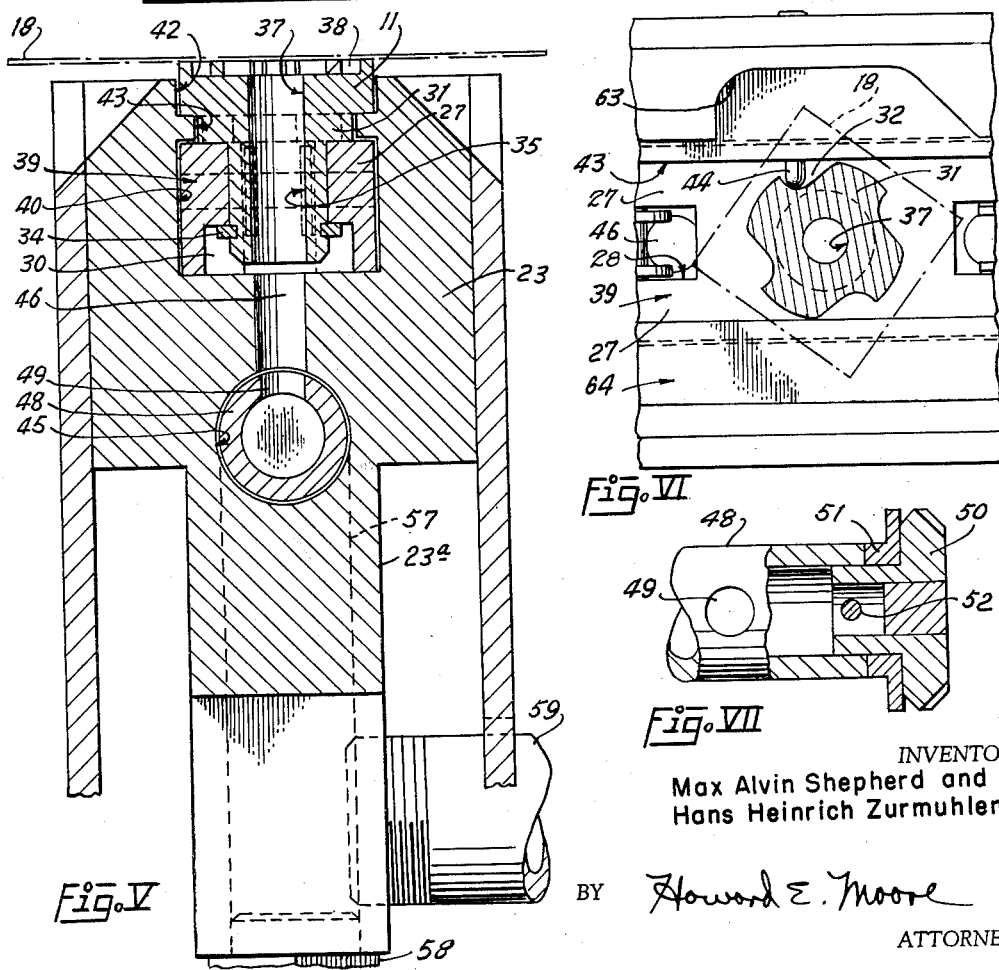

This invention is concerned with improvements in a machine for trimming and cutting pictures to a desired size, and in a manner to center the subject of the picture between the borders thereof.

In the printing of high school and college annuals, or other similar publications, in which a great number of photographs are mounted and reproduced, it is necessary to trim the pictures on all sides to a uniform size and in a manner that will center the subject of the photograph in the picture. This is required in order to permit the printing of the greatest number of pictures on a given page, and to arrange the pictures on the page in such a manner that the subjects will be uniformly spaced vertically and laterally, and properly aligned on the page for the printing of identification material in connection with the respective subjects.

Heretofore such trimming and sizing of pictures has been done by hand, or hand operated cutters were used, requiring a great deal of labor and slowing down production.

This invention is intended to provide an automatic machine which, when adjusted to cut and trim pictures of a particular size, will automatically center the subject of the picture and trim and cut same to a given size, requiring only the labor of a single operator to do the labor previously requiring a great number of individual trimmers.

The device embodying the inventions herein claimed provides as basic components to carry out the objects hereinafter enumerated, a conveyor in conjunction with suction means retaining pictures to the conveyor, means to automatically rotate the pictures 90° to allow same to be trimmed and cut on all sides, and wherein the cutter blades thereon may be adjusted laterally to cut the picture to a desired size, and means is provided for centering the subject of the picture with relation to the adjusted cutting blades.

It is, therefore, a primary object of this invention to provide a picture trimming machine for automatically trimming pictures or the like to a desired predetermined size, wherein the subject of the picture is centered on the picture after it is trimmed.

Another object of the invention is to provide in a picture trimming machine picture holding heads mounted in spaced relationship on a conveyor with suction means associated therewith to apply continuous suction to the holding heads while passing over the track therefor, to cause the pictures to adhere to the holding heads.

Another object of the invention is to provide means for rotating the picture holding heads 90° in order to trim all sides of the picture as they pass between the blades along the conveyor.

Still another object of the invention is to provide means for centering the pictures on the holder heads with relation to the blades.

Still another object of the invention is to provide means for stopping the holder heads at a desired and predetermined position to allow the operator to center the subject of the picture with relation to the holder heads.

Still another object of the invention is to provide means for giving visual indication of the adjustment of the blades for a particular size picture cut thereby.

Still another object of the invention is to provide in a picture trimming machine a track in conjunction with a conveyor, having holder heads mounted in spaced relationship thereon, including spaced passages through the track communicating with the passages through the holder heads, and a rotatable tube underneath the track, having spiral holes therein to which suction is applied, and wherein the rotation of the suction tube and the movement of the conveyor are so synchronized that a continuous suction is applied through the passages in the bottom of the track and through the passages in the holder head to a picture or the like disposed on the upper surface of the holder head, in a manner to concentrate the suction on the pictures as they move along the track on the holder heads, to maintain same thereon.

Another general object of the invention is to provide a machine for automatically centering subjects on pictures, and trimming said pictures to a desired, pre-selected size, which results in a great savings in labor and time and increased production.

Although the machine described herein is primarily desired for trimming pictures, it will be obvious that it could be used for cutting and trimming other flat articles made of paper, plastic, or other material, to a predetermined size, either for the purpose of producing multiple articles of uniform size, or for centering printed material or designs thereon.

Other and further objects of the invention will become apparent upon reading the detailed specification hereinafter following, and by referring to the drawings annexed hereto.

A suitable embodiment of the invention is shown in the attached drawings, wherein:

FIGURE I is a perspective view of the picture trimming machine;

FIGURE II is a side elevational view of the conveyor and track, associated with the suction tube and cutter blades;

FIGURE III is a fragmentary, enlarged plan view of a section of the conveyor and track with a typical picture holder head mounted thereon and showing the pin protruding into the track channel for rotating the picture holder head by 90°;

FIGURE IV is a cross-sectional, elevational view taken on the line IV—IV of FIGURE III;

FIGURE V is a transverse sectional view taken along the line V—V of FIGURE III;

FIGURE VI is a fragmentary plan view of the track, showing the cam and pin arrangement for rotating the picture holder head, with the picture holder head removed for purpose of illustration;

FIGURE VII is a fragmentary, cross-sectional, elevational view of the suction tube with drive gear and seal ring attached to the end thereof; and FIGURE VIII is a fragmentary, side elevational view showing cam wheel in conjunction with the stop switch, for stopping the picture carrier heads at a predetermined position with relation to the viewer.

Numeral references are employed to designate the various parts shown in the drawings, and like numerals indicate like parts throughout the various figures of the drawings.

FIGURE I is a perspective view of the overall appearance of the picture trimmer machine, certain components of which are conventional elements not thought necessary to illustrate in detail, the claimed improvements being illustrated in detail in FIGURES II–VIII.

As shown in FIGURE I, the numeral 1 generally indicates a frame for the machine which includes a table-like member, supported by suitable legs and brace members generally indicated at 2.

A conventional suction pump 3 driven by a suitable electric motor, is secured to the chassis of the frame, for supplying suction through the suction tube 48, as hereinafter described.

An electric motor 4 is suitably secured to the frame 1 for the purpose of driving the various components of the machine through conventional gear and drive chain arrangements, which will be hereinafter indicated.

The starting of the drive motor 4 is controlled by a foot pedal switch 5 which may be actuated by the operator of the machine. The foot pedal switch 5 is connected through a cable 6 to a control box 7, wherein there is contained suitable control relays and switches connected to the various electrical components for controlling the operation of the motor 4 in the manner and for the purposes hereinafter indicated.

The rotative power is transferred from the motor 4 through a variable speed transmission 8, controlled by an arm 8a. The power is transferred from the motor 4 to the transmission 8 through a drive belt 9 extending about suitable pulleys.

The general frame of the machine includes a bifurcated member consisting of spaced plate members, indicated generally at 10, on which the carrier chain 24, hereinafter described, is mounted for rotation.

A plurality of picture holder or carrier blocks 11 are mounted in spaced relationship on, and in rotative relationship to, the carrier chain 24, as hereinafter more specifically described.

A conveyor, generally indicated at 12, consists of a housing, having an arcuate slot 14 therein, in which runs a belt 13, driven by a chain 13a through suitable driving and gear arrangements from the transmission 8. The belt is of a material which will cause paper or other flat material trimmed by the machine to adhere thereto as it is conveyed along the slot 14. After being picked up by the belt 13 from the carrier chain 24, the picture or other flat member is conveyed along slot 14 and is engaged by the upwardly extending ledge 15a to disengage same from the conveyor belt 13 and deposited in the receiver 15, being retained therein by rear retainer ledge 15b, which is adjustable along the slot 15c to accommodate different size pictures or the like.

A standard, commercial type photographic enlarger projector 16 is mounted to the frame of the machine by the supports 16a and 16b.

The enlarger projector 16 has a lens 17 thereon, through which is projected a square pattern upon a picture or other flat article 18 disposed upon the carrier head 11 therebelow, to allow centering of the visual imprint on the picture or other flat article to be trimmed, prior to passing same between the blades in the manner hereinafter described.

The size and position of the projected rectangular light pattern may be adjusted by turning the adjustment knobs 77 and 78 on the enlargement projector 16 in order to center same over the carrier heads 11.

Pairs of rotatable interengageable front blades 19 are disposed in rotative relationship on each side of the carrier chain 24. The said front blades 19 are mounted on laterally adjustable carriers 19a and 19b, and are rotated through appropriate gear trains 19c rotatably disposed in the supports 19a and 19b. The gears 19c are driven through appropriate drive means from the motor 4 through the drive chain 20.

Rear rotatable blades 21 are of the same construction as front blades 19, and are also mounted on laterally adjustable support means 21a at each side of the carrier chain 24. The blades 21 are driven by appropriate gear train 21b through appropriate shafting and gearing from the motor 4 through the drive chain 22.

The track body 23 (FIGURE II) is an elongate member about which the carrier chain 24 is arranged to rotate on suitable sprockets 25 and 26, which are driven through suitable shafting and gearing, and chain drive from the motor 4.

Spaced along the conveyor chain 24, are carrier bodies 27, (FIGURES III and IV), having slots 28 in the ends thereof embracing links of the conveyor chain 24, which extend thereinto and are pivotally pinned thereto by suitable pivot pins 29.

The carrier blocks 27 each has a recess 30 (FIGURES IV and V) formed in the lower surface thereof, which provides a suction chamber in the manner hereinafter described.

Cam wheel 31 has cam recesses 32 provided in the periphery thereof, and a tubular extension 33 thereon. The cam wheel 31 is secured to the carrier head 11, and the tubular extension 33 thereof rotatably extends through a passage provided through the carrier body 27, and is secured therein by means of a spring latch ring 34 which is engaged in a peripheral slot 34a about the outer end of the tubular extension 33.

Bores 35 and 37 extend through the extension 33, cam wheel 31 and carrier head 36, so that there is communication through such members to the vacuum chamber 30.

The carrier head 11 has radiating slots 38 formed in the upper face thereof, which communicates with the bore 35 for the purpose hereinafter mentioned.

A channel or track, generally indicated at 39, is provided along the upper face of the track body 23, said channel being comprised of a lower channel 40 along which the carrier body 27 may slide, with the lower edge thereof engaging the bottom of the channel as it slides therealong. The track channel 39 also includes an upper channel 42 which is separated from the lower channel 40, by restricted width 43. The cam wheel 31 slides along the restricted width 43, and the carrier head 11 slides along the upper channel 42.

A threaded pin 44 extends through the wall of the track body 23 and protrudes from the inner wall of the restricted width 43 of the track channel 39, said pin 44 being arranged to engage one of the cam recesses 32 on the cam wheel 31 to rotate the cam wheel 31 by 90° as the conveyor chain moves along the track channel, to thereby turn the picture or other flat element disposed on the carrier head 36 by 90° in the manner hereinafter described.

The track body 23 has a longitudinal, cylindrical bore 45 (FIGURES IV and V) formed therein which is closed at one end by a threaded plug 47 (FIGURE II).

Spaced holes, or passages, 46 are formed through the floor of the lower channel 40 so as to provide communication between the lower channel 40 and the longitudinal bore 45.

A rotatable suction tube 48 is inserted in the bore 45 from one end thereof. The suction tube 48 has spaced holes 49 provided through the wall longitudinally thereof in a spiral pattern (FIGURE IV). Suction tube 48 has a bevel gear 50 attached to the outer end thereof, said beveled gear 50 having an extension thereon (FIGURE VII) inserted through a resilient seal washer 51, and is secured in the bore of the suction tube 48 by means of a suitable set screw 52. A laterally disposed bevel gear 53 (FIGURE II) is attached to, and driven by, a sprocket 54, said bevel gear 53 being enmeshed with the bevel gear 50 attached to the end of suction tube 48, to thereby rotate suction tube 48 in the bore 45. Sprocket 54 is driven through a suitable drive chain 55 which is rotated by a drive sprocket 56 attached to the same shaft which rotates the sprocket 26.

A downward extension 23a (FIGURE II and IV) is provided as a part of the track body 23. A cylindrical bore 57 is provided through the extension 23a, which intersects the longitudinal bore 45. The bore 57 is closed at its outer ends by a threaded plug 58.

A suction line elbow fitting 59 is threaded into a passage through the wall of the extension 23a into the bore 57.

A flexible suction line 60 is attached to the fitting 59 and communicates with the suction pump 3, to apply a suction to the bore 57 and bore 45. Inasmuch as the suction thus exerted tightly draws the resilient seal ring 51 against the outer face of the body 23 to seal the bore 45, and inasmuch as the bores 45 and 57 are closed at the outer ends by threaded plugs 47 and 58, respectively, the suction thus applied is concentrated through the passages 49 in the wall of the suction tube 48, passages 46 through the floor of the lower track channel 40, and the bores 35 and 37, to thereby concentrate the suction to the picture or other flat member disposed on the upper surface of the carrier head 11, as more particularly hereinafter described.

Guide members 61 (FIGURE I) are provided on each side of the track 39 immediately in front of the front blades 19, to guide the picture 18 between the blades for trimming the opposite edges therefrom. Similar guide members 62 are provided on each side of the track 39 immediately in front of the rear blades 21, to guide the picture 18 between the blades 21 for trimming the other opposite edges of the picture after it has been rotated 90° in the manner hereinafter described.

A relieved portion, or turning recess 63 (FIGURE III), is provided in the upper surface of the track 39 in the edge of the upper channel 42, which is commensurate with the depth of said channel 42. Said turning recess is located immediately above the cam pin 44.

On the opposite side of the track 39, there is provided another turning recess 64 in the edge of the upper channel 42, which is also commensurate with the depth thereof.

When the pin 44 engages one of the cam recesses 32 on cam wheel 31 (FIGURE VI), the cam wheel 31 and picture carrier 11, together with the picture 18 adhering to the upper surface thereof, is caused to rotate by 90° to place the opposite edges of the picture 18, which have not been trimmed, in line with the rear blades 21 to trim same as the picture passes therebetween. The turning recesses 63 and 64, permit the picture carrier head 11 and the picture 18 to rotate by 90° but after the picture carrier head has passed the recesses 63 and 64, the edges of the upper channel 42 will hold same in alignment, and therefore hold the picture 18 in alignment for passage between the rear blades 21.

A stop cam wheel 65 (FIGURE I) is provided which is turned by appropriate drive means from the motor 4, and is synchronized with the rotation of the conveyor chain 24, so that the stop shoulders 66 thereon will engage a solenoid actuated arm 68 to assure that a picture carrier head 11 will stop at the correct position under the viewer lens 17. The carrier chain 24 will not again move until the solenoid 67 is energized by closing the foot pedal switch 5, to withdraw the arm 68 from engagement with the stop shoulder 66.

Mounted on the shaft 73 on the other side of the bifurcated frame 10 is a cam wheel 72, having cam lugs 74 spaced 180° apart thereon. A micro-switch 69 is mounted in conjunction with the cam wheel 72, said micro-switch having a switch button 71 thereon, which is controlled by the spring arm 70.

The switch 69 is normally closed and is in the circuit between the switch 5 and the motor 4.

The cam lugs 74 are so arranged with relationship to movement of carrier chain 24 and the heads 11 that when a head 11 reaches a pre-selected position under the lens 17 of the enlarger 16, one of the cam lugs 74 will engage the spring arm 70 and push it down to depress the micro-switch button 71, to thereby break the circuit and stop the motor 4. One of the stop shoulders 66, engages the solenoid actuated arm 68, to stop the carrier chain 24 to prevent coasting thereof, to thereby assure that one of the carrier heads 11 will stop in the correct position under the lens 17 of the enlarger 16. When the switch 5 is again depressed to start the machine, the solenoid 67 will be energized, withdrawing the arm 68 from engagement with the stop shoulders 66, for sufficient time to allow the cam wheels 65 to turn counterclockwise enough to disengage the arm 68 from the stop shoulder 66, so that the arm 68 will ride on the outer surface of the cam wheel 65, until the cam wheel has rotated 180° to cause the stop arm 68 to come into contact with the other stop shoulder 66, at which time one of the legs 74 on the cam wheel 72 has open end switch 69 to stop the motor 4 in the manner hereinbefore described.

As hereinbefore stated, the front blades 19 and rear blades 21 are mounted upon transversely slidable carriages 19a–19b, and 21a, respectively, which may be moved inwardly and outwardly laterally by rotating a lead screw, such as indicated at 79, by means of hand wheels (not shown) located on the other side of the machine as shown in FIGURE I. Thereby the blades 19 and 21 can be adjusted in lateral relationship to cut and trim a picture or other flat article to a desired size within certain limits of adjustment.

The indicator wheels 75 are geared to the support members 19a, 19b and 21a so that upon lateral movement of the supports in adjusting the blades 19 and 21, the wheels 75 are rotated. Wheels 75 have indicator scales on the outer peripheries thereof, which are aligned with slots 76 in the plates 76a to indicate the correct adjusted settings for the blades 19 and 21 to cut pictures of a particular size. Therefore, a chart can be made indicating the correct settings of the blades with reference to the scales on the wheels 75, to indicate the correct setting for different dimensions.

The operation and function of the picture trimming machine, hereinbefore described, is as follows:

After determination of the proper size to which the picture 18 is to be trimmed, the blades 19 and 21 are adjusted by moving the carriages 19a, 19b and 21a inwardly or outwardly to proper position to cut the picture to the desired size.

The lens 17 of the enlarger viewer 16 is adjusted by the adjustment controls 77 and 78, to properly center the projected image over the picture 18 to be trimmed in order to center the subject appearing on the picture with relation to the carrier head 11. A test run of the picture may be made through the blades 19 and 21, and same may be measured to determine whether a correct setting has been made. After the blades 19 and 21 have been so adjusted, and the viewer has been adjusted to center the subject on the picture, an untrimmed picture 18 is placed over the carrier head 11 and is visually centered thereover by the projected square light pattern from the enlarger 16. The picture is caused to adhere to the upper surface of the carrier head 11 by reason of a suction exerted through the bores 46, 35 and 37, and through the suction tube 48 in the manner hereinbefore described. Such suction is distributed over a relatively large area of the picture 18 by reason of the slots 38 communicating with said bores. The foot pedal switch 5 is then depressed energizing the motor 4, and the solenoid 67, releasing the solenoid wheel 65, which permits the chain carrier 24 to begin rotation. The starting of the motor 4 also initiates rotation of the conveyor belt 13. As the conveyor head 11 moves along with the carrier chain 24, the suction tube 48 rotates, causing the spirally arranged passages 49 to successively come into registry with passages 46 through the floor of the lower channel 40, to thereby apply suction through the suction chamber 30 and bores 35 and 37 to the picture 18 disposed thereover. The rotation of the suction tube 48 is synchronized with the movement of the carrier head 11 so that the passages 49 are continuously in registry with passages underneath the carrier head as it moves along, thereby concentrating the suction through the bores 35 and 37 to the picture as it moves along the conveyor chain. This assures that the picture will have a strong suction applied thereto to cause it to adhere to the carrier head 11. The carrier heads 11 are so spaced with relation to the speed of rotation of the suction tube 48, that successive carrier heads, as they move along with the carrier chain 24, are continuously brought into registry with the passages 49, as the tube 48 rotates.

As the picture 18 is guided between the front cutter blades 19 on each side of the track 39 by the guide members 61, and as the picture passes between the cutter blades 19, it is trimmed off on each side. When the cam wheel 31 reaches the pin 44, extending into the reduced width channel 43, the pin engages in one of the cam slots 32, causing the rotation of the cam head 31 and the carrier head 11 which is secured thereto. This causes the 90° rotation of the picture 18 as the carrier head 11 is permitted to rotate in the recesses 63 and 64 provided in each side of the track 39. After being so rotated, the picture is guided between the rear cutter blades 21 by the guide members 62, thereby trimming the other two sides of the picture, leaving the picture cut in a square pattern of the desired size, and with the subject thereon centered with reference to the edges. The picture is then picked up by the slightly adhesive conveyor belt 13 and carried through the channel 14, where it is deposited in the receptacle 15 after being raked from the conveyor belt 13 by the upwardly extending flange 15a.

The speed of rotation and the switching arrangement is so provided that carrier heads 11 are stopped in the manner hereinbefore described at the correct position under the lens 17 of the enlarger 16 for placing another picture thereon. The carrier heads 11 may be successively moved between the blades by actuating the foot pedal switch 5 in the manner hereinbefore described.

The suction is continuously applied while the machine is in operation to assure adherence of the pictures 18 to the upper surface of the carrier heads 11.

It will be understood that other and further embodiments of the invention may be made without departing from the spirit and scope of the appended claims.

Having described our invention, we claim:

1. In a trimmer machine,
an elongated body;
a channel track provided along the upper surface of the body;
a longitudinal bore in the body;
spaced passages providing communication with the bore through the floor of the channel;
a rotatable tube in the bore;
spaced spirally arranged passages through the wall of the tube,
  extending longitudinally of the bore, arranged to come into registry with the passages through the floor of the channel as the tube rotates;
a conveyor member rotatable about the body and along the channel;
a carrier head attached to the conveyor
  arranged to be rotatable with reference thereto;
an axial passage through the carrier head
  communicating with the longitudinal bore through the passages through the floor of the channel to apply suction through the carrier head passage;
and means to apply suction to the longitudinal bore.

2. The combination called for in claim 1 with the inclusion of
a cam wheel arranged about the rotatable carrier head;
and a cam pin extending into the channel
  engageable with the cam wheel,
    to rotate the carrier head as the conveyor moves.

3. The combination called for in claim 1 wherein the carrier head extends above the edges of the channel track;
and opposed recesses are provided in the edges of the track
  to permit rotation of the head in said recesses.

4. The combination called for in claim 1 with the addition of
pairs of rotatable blades spaced on opposite sides of the track
  there being two sets of said blades spaced longitudinally of the track.

5. The combination called for in claim 1 with the addition of
means to stop the conveyor member with the carrier head at a predetermined position of rotation of the conveyor member.

6. The combination called for in claim 4 with the addition of
means to laterally adjust the pairs of blades with reference to the track.

7. The combination called for in claim 4 with the addition of
means to laterally adjust the pairs of blades with reference to the track;
and means to indicate the position of adjustment of the blades.

8. In a trimmer machine,
an elongated body;
a channel track provided along the upper surface of the body;
a longitudinal bore in the body under the track;
spaced passages through the floor of the track communicating with the bore;
a tube rotatably disposed in the bore;
spaced spirally arranged passages through the wall of the tube extending longitudinally of the bore
  arranged to successively come into registry with the passages through the floor of the channel as the tube rotates;
a conveyor member rotatable about the body and along the channel,
a plurality of carrier heads rotatably attached to the conveyor;
a passage through each said carrier head
  arranged to communicate with the bore through the passage in the floor of the channel as the heads pass along the channel.
pairs of oppositely disposed rotatable, blades spaces longitudinally of the track;
cam means on each head;
and a cam actuating pin extending inwardly of the track
  intermediate the sets of blades arranged to engage the cam means to rotate same by 90° between the sets of blades.

9. The combination called for in claim 8 with the addition of
a rotatable conveyor belt
  arranged to receive a trimmed article after passing between the last set of blades.

10. The combination called for in claim 8 with the addition of
light projector over the conveyor;
and means to stop the conveyor at a position so that one of the carrier heads is under the lens of the light projector.

References Cited in the file of this patent
UNITED STATES PATENTS

| | | |
|---|---|---|
| 1,277,367 | Blasier | Sept. 3, 1918 |
| 1,624,180 | Pellow | Apr. 12, 1927 |
| 1,678,458 | Biggert | July 24, 1928 |
| 2,618,207 | Hery | Nov. 18, 1952 |